(12) United States Patent
Koeck

(10) Patent No.: US 10,010,989 B2
(45) Date of Patent: Jul. 3, 2018

(54) METHOD AND APPARATUS FOR COLLECTING DEBRIS

(76) Inventor: Anthony Koeck, Kamloops (CA)

(*) Notice: Subject to any disclaimer, the term of this patent is extended or adjusted under 35 U.S.C. 154(b) by 224 days.

(21) Appl. No.: 13/878,338

(22) PCT Filed: Oct. 7, 2010

(86) PCT No.: PCT/CA2010/001562
§ 371 (c)(1),
(2), (4) Date: Apr. 8, 2013

(87) PCT Pub. No.: WO2012/045142
PCT Pub. Date: Apr. 12, 2012

(65) Prior Publication Data
US 2013/0199575 A1    Aug. 8, 2013

(51) Int. Cl.
*B23Q 11/00* (2006.01)
*B08B 5/04* (2006.01)
*B08B 15/04* (2006.01)

(52) U.S. Cl.
CPC ............ *B23Q 11/0046* (2013.01); *B08B 5/04* (2013.01); *B08B 15/04* (2013.01)

(58) Field of Classification Search
CPC ........ B08B 15/04; B08B 5/04; B23Q 11/0046
USPC ............................................ 134/21; 15/300.1
See application file for complete search history.

(56) References Cited

U.S. PATENT DOCUMENTS

| | | | |
|---|---|---|---|
| 5,034,041 A | 7/1991 | Austin | |
| 5,983,445 A | 11/1999 | Baker | |
| 6,503,029 B1 | 1/2003 | Ende et al. | |
| 6,830,113 B2 | 12/2004 | Moore et al. | |
| 7,371,034 B2 | 5/2008 | Clark | |
| 7,396,193 B2 | 7/2008 | Kesten | |
| 2007/0065242 A1 | 5/2007 | Skradski et al. | |
| 2007/0264091 A1* | 11/2007 | Bleicher | B23Q 11/0046 408/58 |

FOREIGN PATENT DOCUMENTS

| | | | |
|---|---|---|---|
| EP | 0799674 | 10/1997 | |
| GB | 2067106 A * | 7/1981 | ............ B08B 15/04 |
| GB | 2240262 | 7/1991 | |
| GB | 2262159 | 6/1993 | |

(Continued)

OTHER PUBLICATIONS

ISR, WO, dated Apr. 7, 2011, Koeck.

*Primary Examiner* — Douglas Lee
(74) *Attorney, Agent, or Firm* — Richard D. Okimaw

(57) ABSTRACT

Disclosed is a method and apparatus for collecting debris produced by a tool from a work location on a work surface. The apparatus comprises an enclosure surrounding and defining the work location within an interior thereof and an outer body located to the outside of the enclosure. The enclosure is spaced apart from the work surface by a gap distance wherein the enclosure and the outer body enclose and define chamber therebetween. The apparatus further comprises a port passing through the outer body so as to place the chamber in fluidic communication with a vacuum source. The method comprises containing the debris at the work location within the interior of the enclosure, drawing the debris between the enclosure and the surface into the chamber and suctioning the debris out of the chamber through a collection port.

9 Claims, 5 Drawing Sheets

(56) References Cited

FOREIGN PATENT DOCUMENTS

| | | | | |
|---|---|---|---|---|
| GB | 2262159 A | * | 6/1993 | ............... B23Q 9/00 |
| GB | 2366224 | | 3/2002 | |
| KR | 100668682 B1 | * | 1/2007 | |
| WO | 9944786 | | 9/1999 | |
| WO | WO 9944786 A1 | * | 9/1999 | ......... B23Q 11/0046 |

* cited by examiner

METHOD AND APPARATUS FOR COLLECTING DEBRIS

BACKGROUND OF THE INVENTION

1. Field of Invention

The present invention relates to debris collection in general and in particular to a method and apparatus for containing and collecting debris from a worksite surface produced by a working tool.

2. Description of Related Art

In construction or renovation, it is frequently necessary to cut, drill or core though walls formed of concrete, brick and other building materials. Such drilling and other material cutting operations are known to produce debris from the material upon which they operate. Such debris may be in the form of dust, chips and the like, or drilling fluid and suspended particles, also known as slurry when the tool operation is lubricated or cooled by a drilling or cutting fluid.

Such debris is undesirable in many locations such as indoors where dust may cause breathing difficulties for occupants. Additionally, liquid entrained drilling debris, or slurry, may be difficult to clean up after it has escaped the drilling area. Such liquid and dust may be damaging to the surrounding area as well as other equipment or objects.

One previous method to contain and remove the debris from the work location is to surround the work location with plastic or another impermeable material so as to collect the debris for disposal. Such methods typically tape or otherwise adhere a plastic sheet around the area for such purpose. These methods are disadvantageously time consuming and cumbersome to install at a given location due to the need to tape or adhere the entire periphery of the plastic sheet. Additionally, such methods are known to leak at locations not properly taped or where the surface to which they are adhered are uneven.

Another attempt to address the above difficulty has been to provide a shield or cover attached to the tool. Such a shield may have a vacuum source attached thereto so as to suction any debris from within the chamber formed by the shield. Disadvantageously, such shields are required to be attached to each tool before use and are therefore limited to a single tool use without time consuming adaptation or modification for use with different tools. The use of tool mounted shields may also require the shield and therefore the tool to remain in place after the tool operation has completed in order to continue removing debris from the work location which further increases the time required to perform the task that is to be performed by the tool. Examples of such shields may be found in U.S. Patent Application Publication No. US2007/0264091 to Bleicher et al.

Other devices have been proposed which define an area around the tool which contains the debris and in which the debris is removed therefrom by a vacuum or the like. Examples of such devices may be found in U.S. Pat. No. 5,983,445 to Baker. Such devices often require a means to secure the device to the work surface such as a separate vacuum source or dividing the debris removal vacuum source. Such division of a single vacuum source may reduce the effectiveness of the debris removal. Additionally, for use with wet tool operations such as concrete coring, the liquid debris or slurry may be prone to running down the works surface, such as a wall. Any liquid or slurry running down the wall may not be collected by such a device and may be permitted to escape between the wall and the device or pooled to be released when the device is removed from the wall.

SUMMARY OF THE INVENTION

According to a first embodiment of the present invention there is disclosed an apparatus for collecting debris produced by a tool from a work location on a work surface. The apparatus comprises an enclosure surrounding and defining the work location within an interior thereof and an outer body located to the outside of the enclosure. The enclosure is spaced apart from the work surface by a gap distance wherein the enclosure and the outer body enclose and define a chamber therebetween. The apparatus further comprises a port passing through the outer body so as to place the chamber in fluidic communication with a vacuum source.

The outer body may support and space the enclosure apart from the work surface. The enclosure may form a central bore extending between a tool entry opening and the work location. The central bore may be cylindrical. The enclosure may be formed of a tubular wall.

The outer body may comprise a shell. The shell may have an inner bore sized to closely surround and engage the enclosure and an outer edge engageable upon the work surface. The outer edge may include a gasket for sealably engaging upon the work surface.

The apparatus may further comprising a connector for selectably securing the shell to the enclosure so as to selectably vary the gap distance as desired by a user. The connector may comprise internal shell threading in the inner bore engageable with corresponding enclosure threading on an outer surface of the enclosure. The connector may comprise a compression fitting. The inner bore may include a radially compressible member radially engageable upon the enclosure. The radially compressible member may be radially compressed by a compression ring.

The port may comprise a bore passing through the outer body. The bore may be defined by a tube extending through the outer body. The tube may be adapted to connect to a vacuum hose.

According to a first embodiment of the present invention there is disclosed a method for collecting debris produced by a tool from a work location on a surface. The method comprises containing the debris at the work location within the interior of an enclosure, drawing the debris between the enclosure and the surface into a chamber located to the outside of the enclosure and suctioning the debris out of the chamber through a collection port. The chamber is defined by the enclosure and a shell extending therearound.

The suctioning may form a partial vacuum within the chamber. The partial vacuum may retain the enclosure and the shell proximate to the surface.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
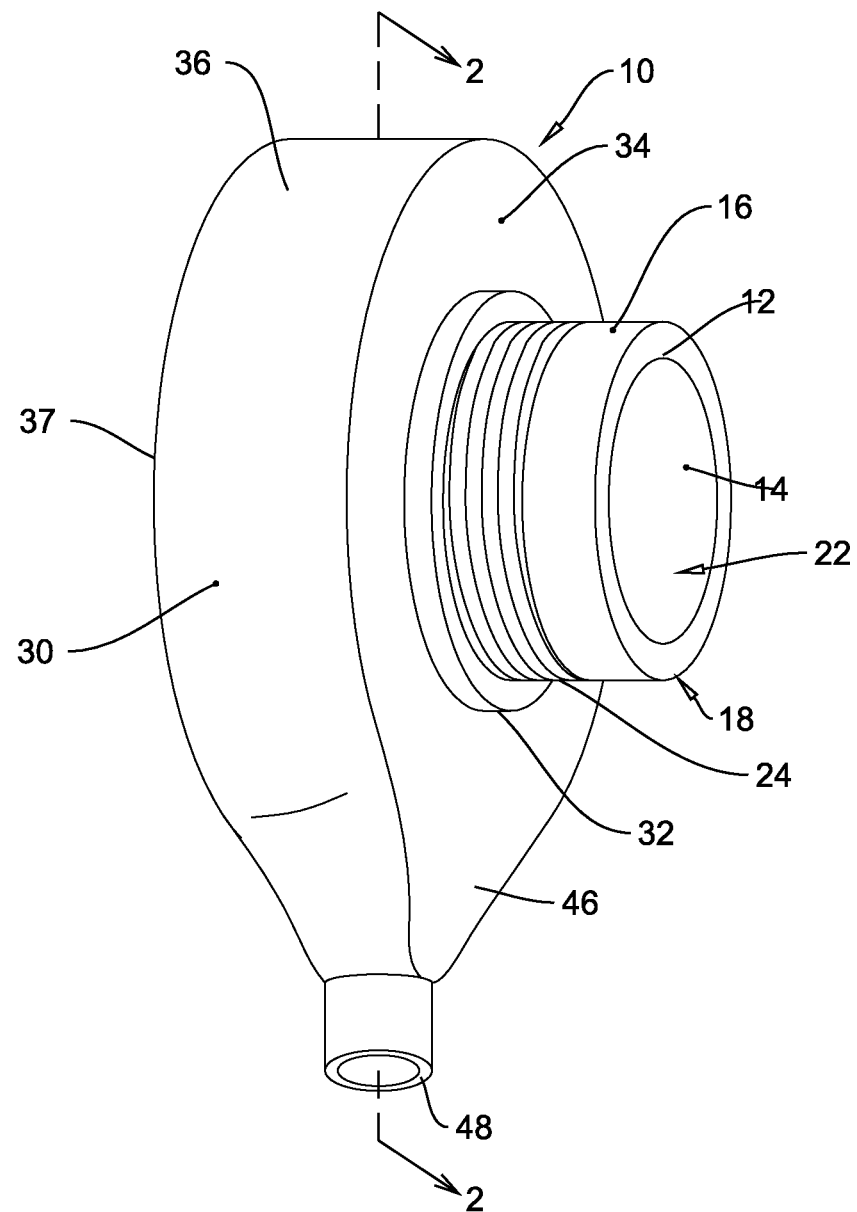
FIG. 1 is a perspective view of an apparatus for collecting debris according to a first embodiment.
Figure 2:
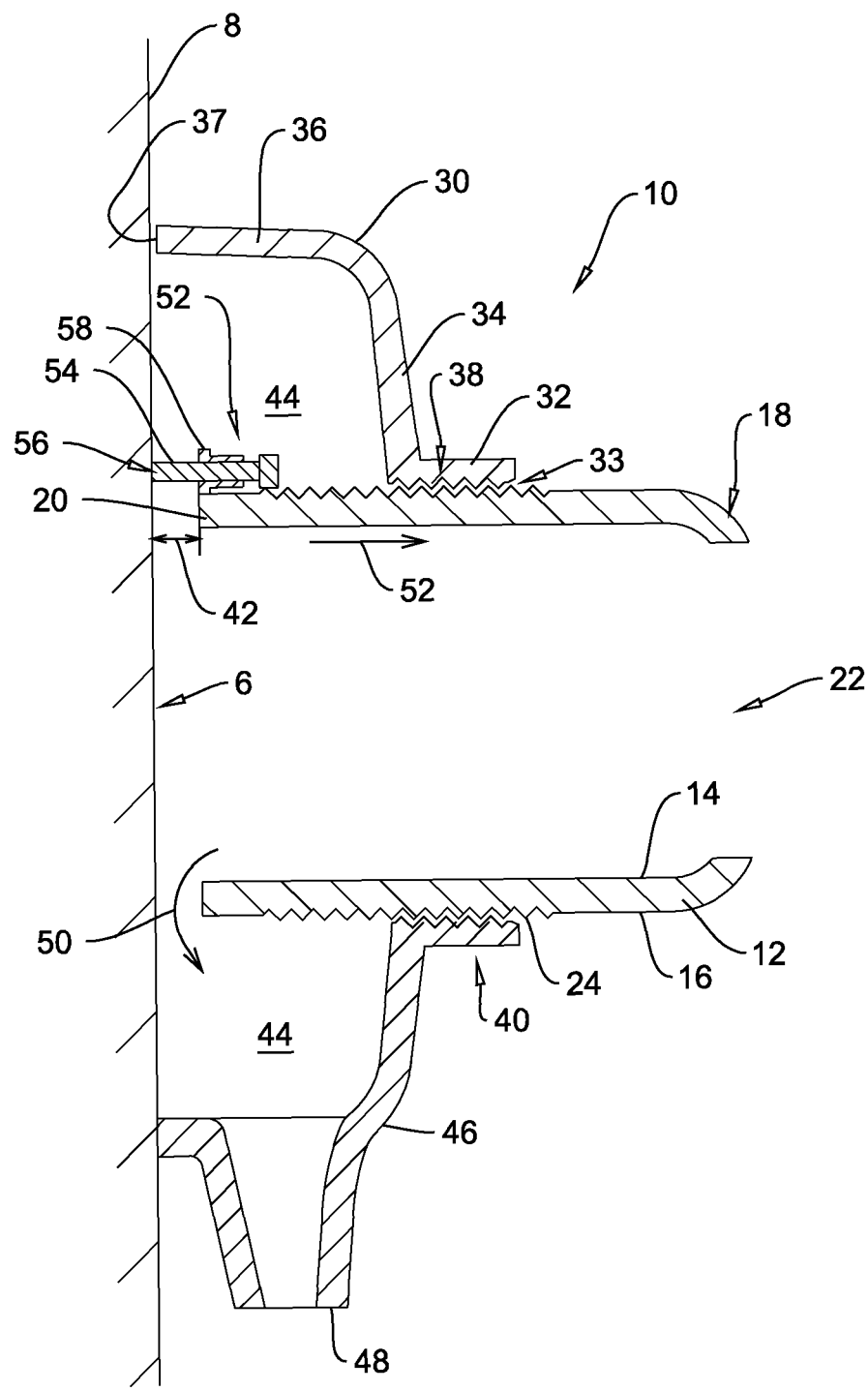
FIG. 2 is a cross sectional view of the apparatus of FIG. 1 as taken along the line 2-2.

Referring to FIGS. 1 and 2, an apparatus for collecting debris according to a first embodiment of the present invention is shown generally at 10. The apparatus 10 comprises an enclosure 12 and an outer body 30 extending therearound. The enclosure or inner sleeve has an inner surface 14 defining a central cavity 22 and an exterior surface 16 having threading 24 or the like thereon. The apparatus is applied to a work surface 8 to which a work operation is to be performed. The apparatus 10 defines and encloses a work location 6 within the central cavity 22 on the work surface 8. Debris produced at the work location 6 is contained by the apparatus 10 and drawn away from the work location for disposal as will be more fully described below. The work operation may comprise any known operation such as, drilling, chiseling, coring, sanding and the like.

The enclosure 12 comprises a cylindrical member having interior and exterior surfaces, 14 and 16, respectively extending between entrance and exit ends, 18 and 20, respectively. The exterior surface 16 includes threading 24 thereon. As illustrated, the central cavity 22 formed by the enclosure 12 extends through the apparatus so as to provide access to the work location 6 from the entrance end 18. In such a way, a tool (not shown) may be passed through the central cavity 22 from the entrance end 18 to the work location 6.

The outer body 30 comprises a shell having an inner hub 32 and annular disk portion 34 extending therefrom. An outer skirt 36 extends from the distal edge of the annual disk portion 34 to abut against the work surface 8 at a distal edge 37 thereof. The inner hub 32 defines an inner bore 33 and includes internal threading 38 that are matable with the exterior threading 24 of the enclosure 12. The internal and exterior threading 38 and 24 form a connector 40 between the outer body 30 and enclosure 12 so as to permit the two to be selectably coupled to each other at a position as desired by the user. As illustrated in FIG. 2, this permits a user to selectably space the exit end 20 of the enclosure 12 apart from the work surface 8 by a gap distance generally indicated at 42. The outer body 30 and enclosure 12 define an annular cavity 44 therebetween for collection of the drilling fluids and solid particles. The outer body 30 also includes a collection funnel 46 and outlet port 48 at a bottom edge thereof. The outlet port 48 is sized to the connected to a vacuum source such as a wet dry shop vacuum or the like.

In operation, the user locates the apparatus 10 against a surface 8 such as a wall or the like that is to be drilled or otherwise worked on and connects a vacuum source to the outlet port 48. This creates a partial vacuum within the annular cavity 44 so as to retain the apparatus 10 against the work surface 8. The partial vacuum within the annular cavity 44 also serves to draw drilling fluids, and the like particles from the central cavity 22 produced at the work location 6 into the annular cavity 44 in a direction generally indicated a 50. The drilling fluid and drilling particles may then be collected within the collection funnel 46 and drawn out of the apparatus through the outlet port 48. By threadably rotating the enclosure 12 relative to the outer body 30, enclosure 12 may be axially moved relative to the outer body in a direction generally indicated at 52 thereby adjusting the gap distance 42 between the exit end 20 of the enclosure and the work surface 8. In this way, the user may adjust and select the desired gap distance 42 depending upon the work being performed upon the work location 6 as well as the conditions of the work surface itself.

The apparatus may be sized to provide a central cavity 22 of sufficient size for the work activity to be performed. By way of non-limiting example, the central cavity may have a diameter of between 2 and 12 inches (51 and 305 mm) although it will be appreciated that other diameters may be useful as well. The apparatus may be formed of any suitable material such as, by way of non-limiting example, metal, plastics, wood, ceramics or composite materials. The apparatus may be sized to permit the gap distance 42 to be adjusted depending upon the needs of the user. By way of non-limiting example, the gap may be adjustable to a wide dimension, such as 1 inch (25 mm) for applications producing large debris particles or where the work surface 8 is rough so as to ensure the distal edge 37 of the outer body 30 engages the works surface as opposed to the exit end 20 of the enclosure 12 engaging the work surface 8. In other applications the gap distance 42 may be reduced to a narrow dimension of ⅛ of an inch (3 mm), by way of non-limiting example for applications producing smaller debris particles such as dust or slurry.

The apparatus 10 may also include gaskets or other sealing materials between the distal edge 37 of the outer body 30 and the work surface 8. Although the outer body is illustrated and described above as having a disk portion 34 and an outer skirt 36 extending therefrom, it will be appreciated that the disk portion and outer skirt 36 may be formed continuously with each other in a continuously curved wall extending from the inner bore 33 to the distal edge 37. In such embodiments the outer body 30 may have a toroidal shape.

Figure 3:
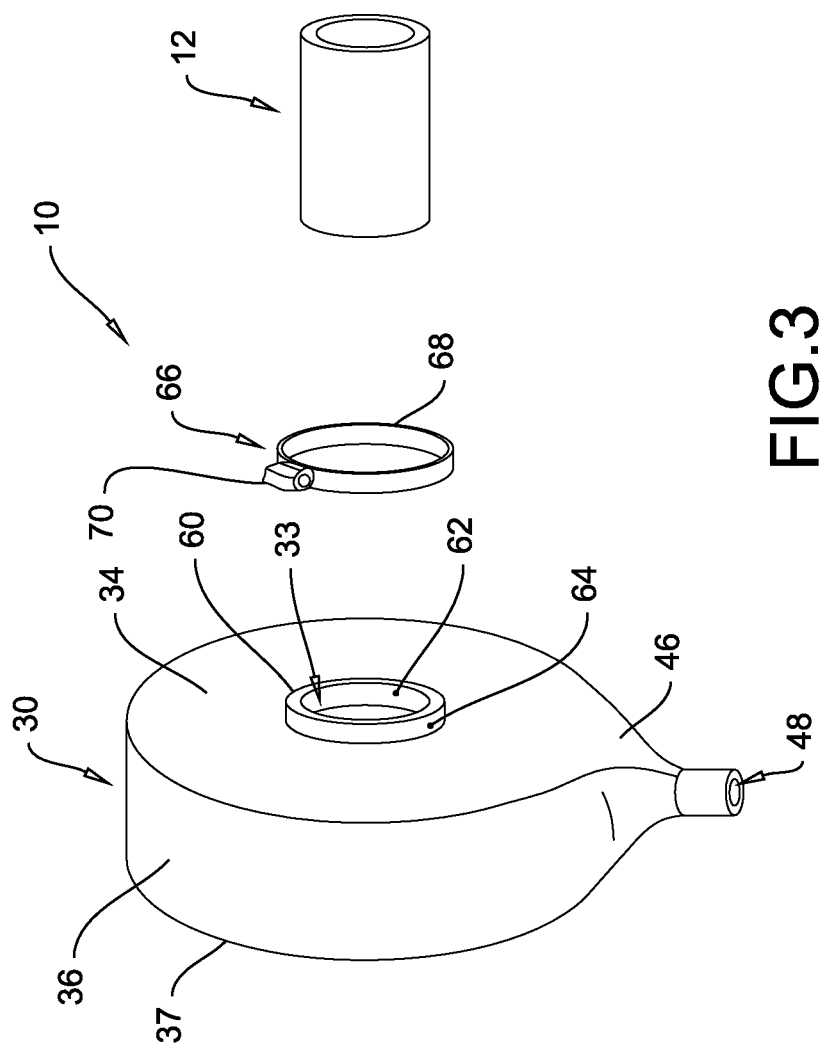
FIG. 3 is an exploded perspective of the apparatus of FIG. 1 having a radially compressible connection between the shell and enclosure according to a further embodiment.

Turning now to FIG. 3, an alternative embodiment of the present invention is illustrated having a compression connection between the enclosure 12 and the outer body 30. The compression connection comprises a flexible inner flange 60 extending from the outer body 30. being formed of a pliable material and having inner and outer surfaces, 62 and 64, respectively. The enclosure 12 is received within the interior of the flexible inner flange 60. A radial compression member 66 is applied around to the outer surface 64 of the flexible inner flange. The radial compression member is adapted to be tightened or otherwise radially reduced in size so as to radially compress inwardly upon the flexible inner flange 60. Under radial compression from the radial compression member 66, the flexible inner flange 60 will be radially deformed inwardly so as to bias the flexible inner flange upon the enclosure and thereby to grip or retain the enclosure at the desired location.

The flexible inner flange may be formed of a thinner section of material than the remainder of the outer body. Alternatively the flexible inner flange 60 may be formed of a pliable material such as natural and synthetic rubbers, silicon, plastics and other elastic materials, by way of non-limiting example. In other embodiments, the flexible inner flange 60 may be sized to closely engage the enclosure 12 in an interference fit so as to frictionally retain the enclosure at a location relative to the outer body without the use of a separate compression member. As illustrated in FIG. 3 the radial compression member 66 may comprise a band of rigid material 68 having a diameter reducing gear 70 such as a screw applied thereto, which is commonly known as a hose clamp.

Figure 4:
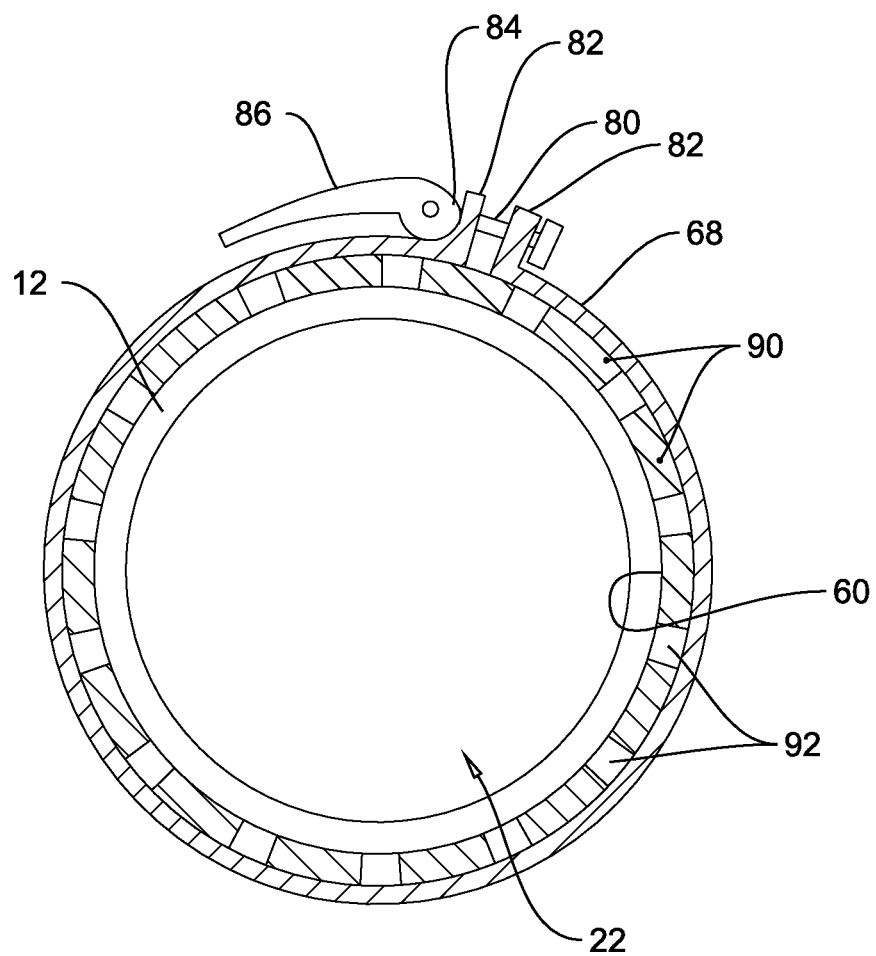
FIG. 4 is a detailed cross-sectional view of a radially compressible connection between the shell and enclosure according to a further embodiment.

In other embodiments, the radial compression member may comprise a band of material extending substantially around the flexible inner flange 60 and screw or rod 80 spanning opposed ends 82 of the band as illustrated in FIG. 4. The rod may have an eccentrically connected cam 84 at one end connected to a lever 86 such that rotation of the cam by the lever reduces the space between the opposed ends 82 of the band 68 so as to radially compress the flexible inner flange 60 therein. Additionally, in some embodiments the flexible inner flange 60 may comprise a plurality of fingers 90 extending axially along the inner bore 33 in parallel to the radial compression member 66 as illustrated in FIG. 4. The fingers 90 may be separated from each other by gaps or slots 92 therebetween so as to surround the enclosure. The fingers 90 may be biased inwardly upon the enclosure 12 by the radial compression member 66 so as to grip the enclosure at the desired location. Optionally, the enclosure 12 may also include one or more spacers, generally indicated at 52 adapted to space the exit end 20 of the enclosure away from the work surface 8. The spacers 52 may comprise spacing screws 54 or the like having distal ends 56 extending parallel to the enclosure 12 so as engage the work surface 8 and maintain the desired gap distance 42. As illustrated in FIG. 2, the spacing screws 54 may be connected to the enclosure by a block 58 or the like proximate to the exit end 20 of the enclosure.

Figure 5:
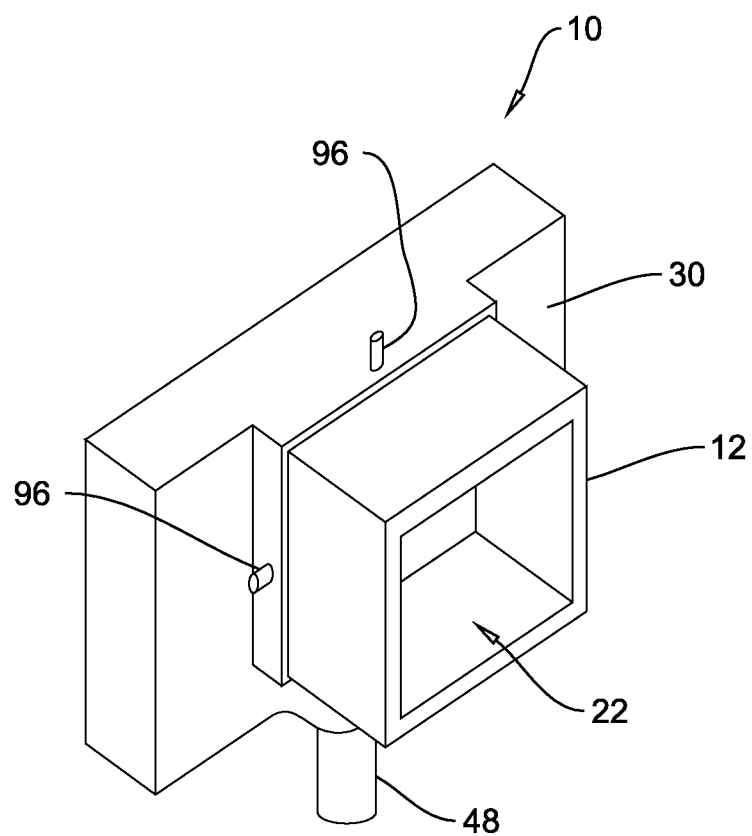
FIG. 5 is a perspective view of apparatus having a non-circular outline for collecting debris according to a further embodiment of the present invention.

It will also be appreciated that the apparatus may also have a non-circular shape as illustrated in FIG. 5. The outer body 30 may have any outline shape as desired by the user including, by way of non-limiting example square, triangular, oval or irregular. Additionally, the enclosure 12 may also have a non-circular shape, such as, by way of non-limiting example square, triangular, oval or irregular. As illustrated in FIG. 5, the outer body and enclosure are substantially rectangular with the inner bore 33 of the inner hub 32 also being substantially rectangular to correspond to the outline of the enclosure 12. In such embodiments the connector may comprise set screws 96 and the like for securing the enclosure 12 to the outer body 30. Also as illustrated in FIG. 5, the enclosure 12 may optionally be positioned to one side of the outer body such that the cavity 44 between the outer body and the enclosure extends only partially around the enclosure. As illustrated in FIG. 5, in such embodiments, it is preferable that the outlet port 48 be positioned at a bottom of the apparatus so as to facilitate removal of liquid debris. It will also be appreciated that for a substantially circular shaped apparatus having the enclosure 12 located to one side of the outer body 30, the cavity 44 formed between the outer body 30 and the enclosure 12 will be u-shaped. Such embodiments may be desirable for work that is to be performed in close proximity to other structures extending from the work surface.

While specific embodiments of the invention have been described and illustrated, such embodiments should be considered illustrative of the invention only and not as limiting the invention as construed in accordance with the accompanying claims.

What is claimed is:

1. An apparatus for collecting debris produced by a tool from a work location on a work surface, the apparatus comprising:

a rigid shell having a distal edge adapted to engage upon the work surface and a bore therethrough having internal threading therein wherein said shell and work surface define a cavity therebetween;

a tubular inner sleeve extending between first and second ends positioned within said bore wherein said first end is located within said cavity and said second end is located outside of said cavity by a distance sufficient to be grasped by a user, said inner sleeve including a central cavity therethrough defining a work location on said work surface;

external threading around said inner sleeve corresponding said internal threading of said bore threadably engaged upon said internal threading of said bore so as to rotatably support said inner sleeve within said bore at a position to space said first end of said inner sleeve apart from said work surface by a gap distance wherein said inner sleeve does not contact the work surface; and a port passing through said shell so as to place said chamber in fluidic communication with a vacuum source, wherein rotation of said inner sleeve relative to said shell axially displaces said inner sleeve relative to said shell so as to vary said gap distance, and wherein said shell maintains said inner sleeve at said gap distance when a vacuum source is applied to said port so as to draw material from said work location through said gap distance and out of said port.

2. The apparatus of claim 1 wherein said enclosure forms a central bore extending between a tool entry opening and said work location.

3. The apparatus of claim 1 wherein said outer edge includes a gasket for sealably engaging upon the work surface.

4. The apparatus of claim 1 wherein said port comprises a bore passing through said outer body.

5. The apparatus of claim 4 wherein said bore is defined by a tube extending through said outer body.

6. The apparatus of claim 5 wherein said tube is adapted to connect to a vacuum hose.

7. A method for collecting debris produced by a tool from a work location on a surface, the method comprising:

locating a rigid shell having a distal edge in engagement upon the work surface, said rigid shell having a bore therethrough having internal threading therein wherein said shell and work surface define a cavity therebetween;

supporting a tubular inner sleeve proximate to a work surface with an open gap distance between said enclosure and said work surface with external threading around said inner sleeve corresponding said internal threading of said bore threadably engaged upon said internal threading of said bore so as to rotatably support said inner sleeve within said bore at a position to space said first end of said inner sleeve apart from said work surface by a gap distance wherein said inner sleeve does not contact the work surface;

said inner sleeve extending between first and second ends within said bore wherein said first end is located within said cavity and said second end is located outside of said cavity by a distance sufficient to be grasped by a user, said inner sleeve including a central cavity therethrough defining a work location on said work surface;

containing the debris at said work location within the interior of said inner sleeve;

drawing said debris through said gap into said cavity; and suctioning said debris out of said chamber through a collection port passing through said shell so as to place said chamber in fluidic communication with a vacuum source, wherein rotation of said inner sleeve relative to said shell axially displaces said inner sleeve relative to said shell so as to vary said gap distance, wherein said shell maintains said inner sleeve at said gap distance when a vacuum source is applied to said port so as to draw material from said work location through said gap distance and out of said port.

8. The method of claim 7 wherein said suctioning forms a partial vacuum within said chamber.

9. The method of claim 8 wherein said partial vacuum retains said enclosure and said outer body proximate to the surface.

* * * * *